United States Patent [19]

Bishop et al.

[11] Patent Number: 4,944,527

[45] Date of Patent: Jul. 31, 1990

[54] INTEGRAL RETAINER, HEAT SHIELD AND ASSEMBLY

[75] Inventors: Robert J. Bishop, Washington; Robert P. Fontecchio, Rochester Hills; Stanley B. Good, Richmond, all of Mich.; Troy C. Hendrix, Maryville, Tenn.

[73] Assignee: Allied-Signal Inc., Morris Township, Morris County, N.J.

[21] Appl. No.: 401,216

[22] Filed: Aug. 31, 1989

[51] Int. Cl.$^5$ .............................................. B60R 21/28
[52] U.S. Cl. ...................................... 280/741; 280/743
[58] Field of Search ......................... 280/732, 741, 743

[56] References Cited

U.S. PATENT DOCUMENTS

| | | | |
|---|---|---|---|
| 4,153,273 | 5/1979 | Risko | 280/743 |
| 4,332,398 | 6/1982 | Smith | 280/732 |
| 4,414,902 | 11/1983 | Strasser et al. | 280/741 |
| 4,842,300 | 6/1989 | Ziomek et al. | 280/743 |

Primary Examiner—Kenneth R. Rice
Attorney, Agent, or Firm—Markell Seitzman

[57] ABSTRACT

A device (20) comprising a planar metal sheet (21;21') having formed thereon at least a first set of opposing shaped slots (60a,b) such that upon forming the planar sheet as an open ended (122) generally cylindrical member or cylinder (28) first portions of the sheet, defined by the slots, extend away from the surface of the formed cylindrical member and form in conjunction with other surfaces of the sheet a plurality of first apertures (62a,b), and the extending first portions serving to define a heat sheet for shielding a portion of an air bag (100), adapted to be secured thereabout, from hot gas generated by a gas generator (50), the device including securement means, interacting with a rearward portion of the cylinderical member and adapted for urging a gas generator (50) into forward facing portions of the cylindrical member, for securing same in place.

20 Claims, 3 Drawing Sheets

U.S. Patent   Jul. 31, 1990   Sheet 2 of 3   4,944,527
FIG. 7
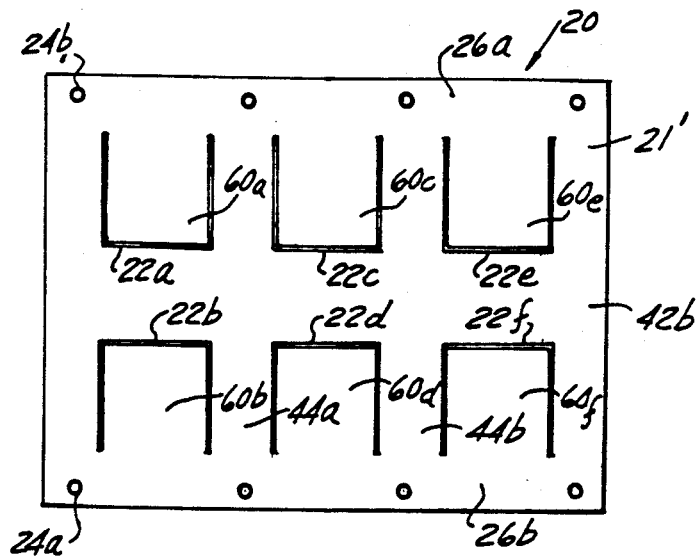
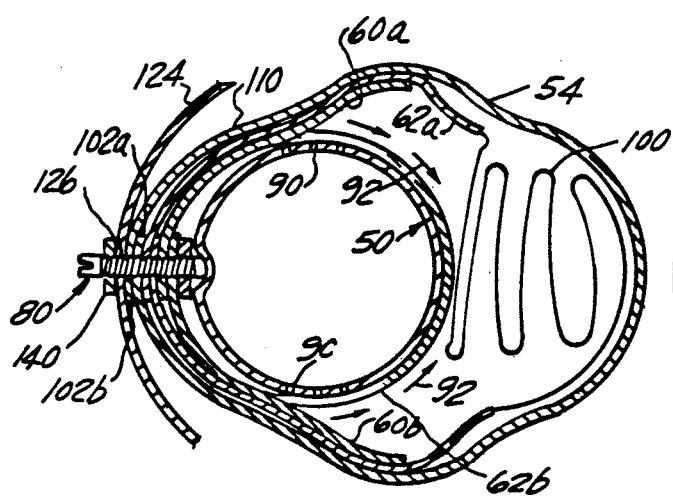
FIG. 9
FIG. 8
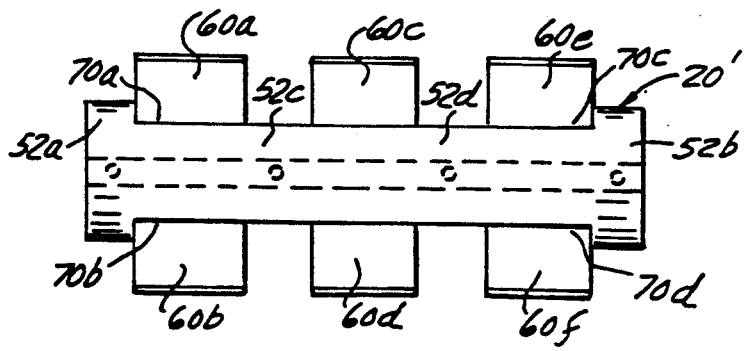

INTEGRAL RETAINER, HEAT SHIELD AND ASSEMBLY

BACKGROUND AND SUMMARY OF INVENTION

The present invention relates to assemblies useful in inflatable restraint (air bag) systems and particularly relates to a retention device for supporting a gas generator retaining an air bag and for shielding the air bag from the heated gases produced by the gas generator.

Inflatable restraint systems are becoming the norm for passenger protection. A rudimentary system comprises of a crash sensor mounted to the vehicle frame and an air bag assembly positioned within the passenger compartment. Differing types of assemblies are used for driver side restraint systems and passenger side restraint systems. The present invention finds specific application with a passenger side air bag restraint system. These assemblies will often include an outer reaction can into which is received a gas generator. This can is a structurally sound member which absorbs and retransmits the air bag deployment forces to the vehicle. The can also supports the weight of the gas inflator and an air bag. Usually the air bag is placed into the can in close proximity to the gas generator and a cover is placed about the can to secure the bag in its nondeployed or stored condition. The reaction can is typically mounted to or near the dash board or instrument panel of the vehicle. Because the reaction can directly supports the weight of the gas generator and air bag and since it is used to transmit the deployment forces it weights is high adding to the overall vehicle weight.

The object of the present invention is to provide an integral air bag/gas inflator/heat shield member. A further object of the present invention is to form a one piece housing defining the retainer and heat shield that is subsequently formed into a cylindrical shape. Another object of the present invention is to provide means for securing a gas generator within the housing. Another object of the present invention is to provide such a device wherein the deployment reaction forces can be transmitted directly to the vehicle as opposed to a reaction can. An additional object is to use the retainer as a securement for the air bag and if the air bag includes tethers to secure the tethers to the retainer.

Accordingly, the invention comprises: a retainer for use in an air bag restraint system of the type using an air bag and gas generator. The retainer comprising a planar metal sheet having formed thereon at least a first set of opposing, generally U-shaped slots such that upon forming the sheet as an open ended cylinder the portions of the sheet, originally within the slots, extend away from the surface of the formed cylinder and form in conjunction with other surfaces of the metal sheet, a plurality of first apertures, and define heat shield means, such as wing-like projections, for shielding a portion of an air bag adapted to be secured thereabout from the hot gas generated, by a gas generator adapted to be secured therein. The invention includes securement means, interacting with a rearward portion of the formed cylinder to urge a gas generator into forward portions of the cylinder, proximate the apertures, thereby securing same in place. The securement means including a plurality of bolts threadably received within a holding member for guiding same into engagement with a Preferably deformable wall of the gas generator. As a result of the compressive engagement of the bolts to the wall, respective depressions are created such as by the elastic deformation of the wall in cooperation with each bolt, to assist in radially and axially securing the gas generator therein.

Many other objects and purposes of the invention will be clear from the following detailed description of the drawings.

BRIEF DESCRIPTION OF THE DRAWINGS

In the drawings:

FIG. 7 illustrates a planar view of another embodiment of the present invention.

FIG. 8 illustrates a front plan view of a retainer obtained with this alternate embodiment.

FIG. 9 illustrates a cross-sectional view of the invention in its fully assembled configuration.

DETAILED DESCRIPTION OF THE DRAWINGS

Figure 1:
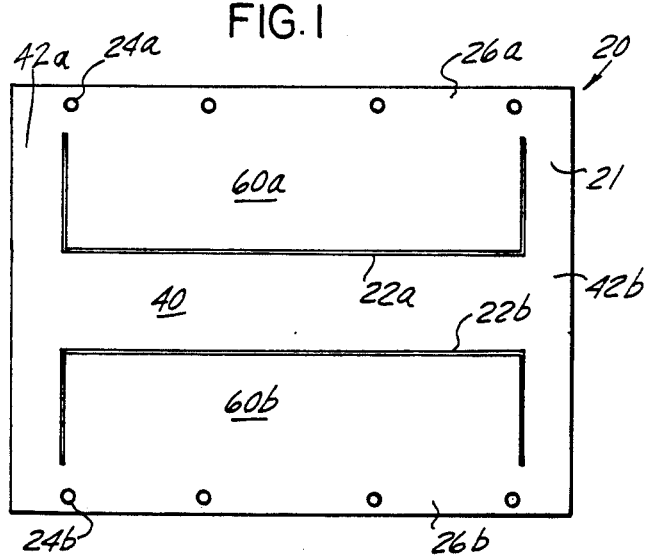
FIG. 1 illustrates a planar view of a sheet in accordance with the present invention prior to its being formed into a cylindrical shape.
Figure 4:
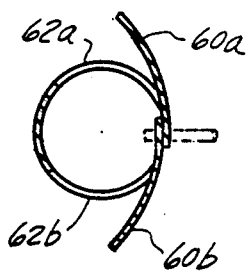
FIG. 4 is a cross-sectional view through section 4—4 of FIG. 2.
Figure 2:
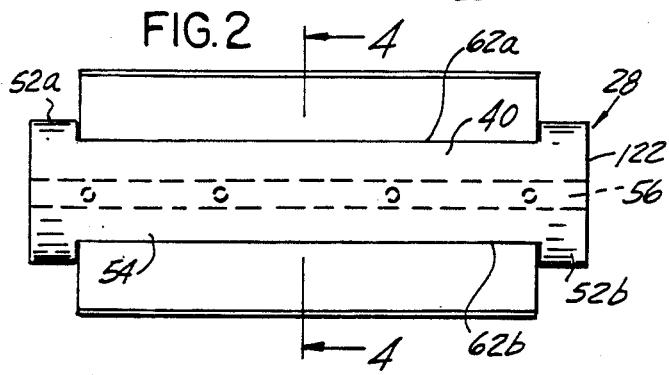
FIG. 2 illustrates a front plan view of a formed retainer.
Figure 3:
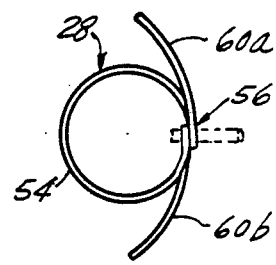
FIG. 3 is a plan end view of the device shown in FIG. 2.

With reference to the Figures, and in particular FIG. 1, there is shown a planar view of an integral air bag/inflater/heat shield 20, hereinafter called retainer 20 in an early stage of assembly. The retainer 20 comprises a substantially planar metal sheet 21 having formed therein two opposing U-shaped slots 22a and 22b. Such slots may be sharp cornered as illustrated, curved, etc. Positioned above slot 22a are a plurality of openings 24a and positioned below slot 22b are another plurality of slots 24b. The sets of openings 24a and b are fabricated in sides 26a and b of the sheet 21. The openings 24a and 24b are aligned and spaced relative to one another such that when the planar sheet 21 is rolled about itself and the sides are placed in overlapping engagement as shown in FIGS. 2–4 the sets of holes 24a and b will be registered one to the other. A bolt shown diagrammatically in FIGS. 3 and 4 will extend through the registered holes 24.

Figure 5:
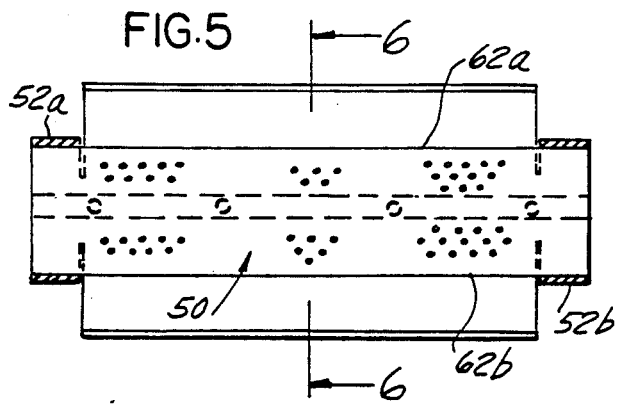
FIG. 5 is a front sectional view of the device shown in FIG. 2 and also illustrates the placement of a gas generator therein.
Figure 6:
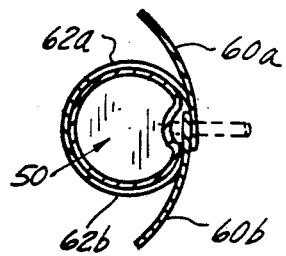
FIG. 6 is a cross-sectional view through section 6—6 of FIG. 5.

The two opposing U-shaped slots 22a and b define therebetween a center member 40 and ends 42a and b within the sheet 21. The distance between the holes 24a and b is chosen such that when the sheet 21 is in its rolled over configuration its diameter is slightly larger than the diameter of an associated gas generator 50 (see FIGS. 5 and 6). The bolt shown in FIG. 6 is a diagrammatic representation.

With reference to FIG. 2, such figure illustrates a formed retainer 20, i.e., cylinder 28, with the sides 26a and b in overlapping, registered alignment. The ends 42a and b have been formed into cylindrical end bands 52a and b joined at a forwardly extending location by the center member 40 which forms a partially enclosed axially extending side 54 of the cylinder 28, the overlapping sides 24a and 24b forming a rear side 56 thereof.

The process of rolling over, or otherwise forming, the planar sheet 21 to achieve the cylindrical shape shown in FIG. 2 will cause members 60a and b of the sheet, i.e., the portion of he sheet 21 within the slots 22, to extend somewhat tangentially, through accurately outward above the main cylindrical shape of the formed retainer 20. The relative positioning of the members 60a and b to the end bands 52a and b is more clearly shown in FIGS. 3 and 4. In this configuration the members 60a and b form wing-like projections extending from the general cylindrical shape of the retainer 20. In this configuration, the elevated orientation of these members 60a and b form, relative to the end bands and sides, a plurality of openings 62a and b.

Reference is briefly made to FIGS. 8 and 9 which illustrate an alternate embodiment of the present invention. There is shown an alternate retainer 20'. The retainer 20' also is formed from planar metal sheet having formed therein plurality of sets of opposing and spaced U-shaped slots 22a–c. As described above, the sides 26a and b include the plurality of aligned openings 24a and b. The planar sheet similarly defines the ends 42 and center member 40. The sets of slots are axially spaced at 44 and b.

Upon rolling over the Planar sheet 21', a substantially cylindrical retainer 20' is formed. The members 60a–f of the planar sheet 21' form a plurality of wing-like structures extending from the general cylindrical shape of the retainer 20'. In this configuration the members 60a–f form a plurality of openings 70a–f about the periphery of the retainer 20' and the spaces 44 form a middle band 52c and d. As will be seen from the discussion below, it may be preferable to locate some of the openings 24 so that they are aligned with the spacings 44 (i.e. bands 52 c and d)

In its normal mode of operation, the retainer 20 or 20' provides a housing for the gas generator 50. FIG. 9 illustrates a cross-sectional view of a completed assembly showing a gas generator 50 positioned within a retainer such as retainer 20. FIG. 5 would also represent a cross-sectional view of the embodiment of FIGS. 7 and 8.

Figure 11:
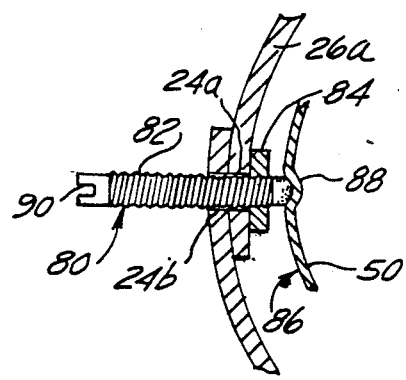
FIG. 11 is an alternate embodiment of some of the elements of FIG. 10.

In its assembled form, a bolt 80 having external threads 82 is received through the registered openings 24a and b and urges the gas generator 50 forwardly against the inner walls of the bands 52 and center member 40, i.e., side 54. The bolt 80 may be secured to the retainer by a threaded nut 84 shown in greater detail in FIG. 11. In this embodiment, a threaded nut 84, one for each opening such as 24a–b, is secured to the inner wall of side 26a. As the bolt 80 is inserted within the threads of the nut 84, its end 85 engages a wall 86 of the gas generator 50, thereby urging the gas generator into the bands 52 and side 54 of the retainer 20. Since the gas generator 50 is most often fabricated of a soft metal such as aluminum, the forward, compressive motion of each bolt 82 will create a respective indentation 88 shown in exaggerated scale, within the wall 86 of the gas generator and to positively secure the gas generator to the retainer 20. As can be seen, the extension of the bolt 80 into the gas generator 50 secures it in a general radial compressive manner. In addition, the cooperation of each of the bolts 80 and their respective indentations 88 prevent the gas generator from moving laterally within the retainer 20. Each bolt 80 may include a slot or recess to facilitate turning.

As can be seen from the Figures, when the gas generator is secured in place a portion of its wall 86 is in mating engagement with a portion of the bands 52 and side 54. Consequently, it is envisioned that the openings 90 (see FIG. 9) of the gas generator will be positioned in direct communication with the openings 62 (or 70) to permit the unimpeded transport of the gases to facilitate an efficient expansion of an air bag 100. The propellant within the gas generator 50 is not shown.

As can be seen from the above, the various bands 52 provide for the primary mode of securement of the gas generator 50 within the formed cylinder 28 and the front facing side wall 54 a secondary mode of securement. The front side 54 also adds a degree of structural rigidity to the cylinder 28 (retainer 20;20'). It is within the scope of the present invention that the front side 54 may be eliminated since once the gas generator 50 is in place there is no particular need for a rigid front side 54. In this situation the side 54 may be replaced by any number of bands 52 (2,3,4, etc.) forming a corresponding number of wing-like members (projections) 62. As an example, and with reference to FIG. 7, the various slots 22 would extend into the middle of the sheet 21'. The various projections 62 could be cut to a length corresponding to that illustrated in FIG. 7. Upon the forming of the retainer, such retainer would include the rear side 56, a plurality of bands 52 and projections extending therefrom. By eliminating the "side" material between the bands 52 would now expose a greater frontal area of the gas generator 50 yielding a greater option in the placement of its opening 90.

During the generation of gas by the gas generator 50, an extreme amount of heat is generated. It is desirable to protect the air bag 100 from these heated gases to prevent same from melting and/or burning. The various wing-like members 60 of the various embodiments of the retainer 20 and 20' extend substantially tangentially outward from the rear of the rolled over retainer 20. In this configuration the various portions 60 provide a heat shield for the air bag 100 and also direct the hot gases, shown as arrows 92, forwardly into the air bag.

Figure 13:
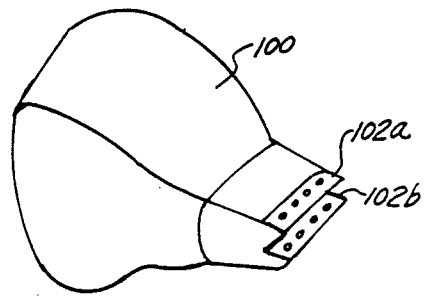
FIG. 13 diagrammatically illustrates an air bag usable in the present invention.

The air bag 100 in FIG. 9 is shown in its folded orientation secured to a retainer such as 20. One such air bag that is usable with the present invention is shown in our copending, commonly owned, U.S. patent application Ser. No. 350,431, which is incorporated herein by reference. This air bag comprises a nylon-like pillow enclosed at one end and having an open end that includes flaps 102a and 102b. The flaps include a plurality of registered openings 106a and 106b, see FIGS. 9,13,14, which when in overlapping configuration about the retainer 20 are aligned to the openings 24 which are positioned about the bolt 80 so that it passes therethrough.

The air bag is maintained in its folded orientation relative to the retainer 20 by a band or material such as 110 received thereabout. The material (sack, band, etc.) 110 is chosen of a material having a tensile stress sufficient to maintain the bag 100 its pre-deployed, folded condition. The strength of the material is such that during initial deployment of the air bag 100 the deployment forces are sufficient to rupture it, thereby permitting the bag 100 to expand with negligible restriction. The material used may be a plastic film, cloth or spun bonded olefin material such as that manufactured under the name of TYVEK manufactured by E. I. DuPont.

A further advantage of the present invention is that the air bag 100 and securing material 110 can be mounted to the retainer 20 prior to insertion of the gas generator. This permits the partial assembly of the retainer/air bag/securing material independent of the gas generator such that the subassembly can be stored in an environment that might be considered hostile to the gas generator.

Figure 10:
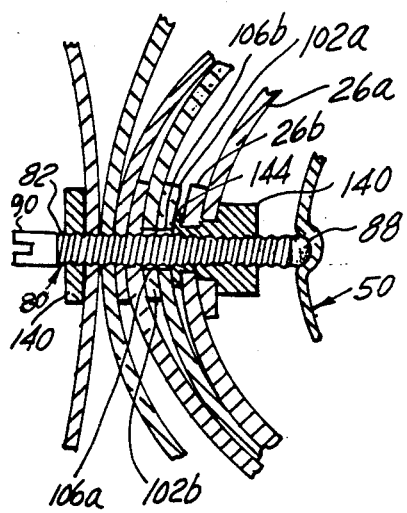
FIG. 10 is an enlarged view of a portion of FIG. 9.

FIG. 10 illustrates an exploded view of a portion of FIG. 9 and illustrates an alternate means of securing the ends 26 of the sheet 21 and for supporting the bolt 80. In this embodiment the set of openings 24a are made slightly wider than the corresponding set of openings 24b. A clinch nut or rivet 140 having internal threads 142 is inserted within the openings 24a and b. The clinch nut 140 includes a clinching end 144 which when formed secures the ends 26a and b in place thereabout. The bolt 80 is thereafter threaded through the clinch nut 140 and into engagement with the gas generator 50.

Figure 12:
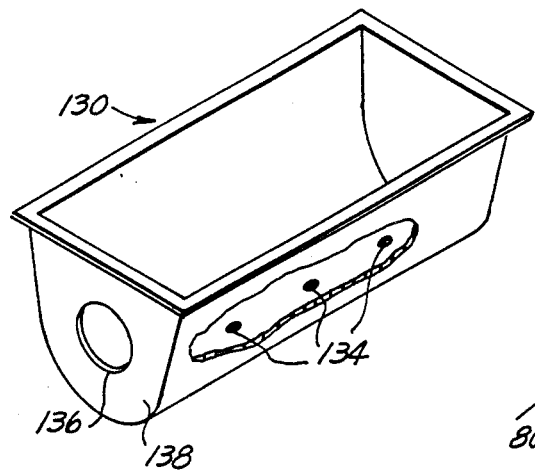
FIG. 12 illustrates a projected view of an outer can.

The following describes a typical assembly sequence for use with the present invention. The planar sheet 21 is formed into a general cylindrical shape as shown in FIG. 2. While a circular cylinder is shown other shapes are within the scope of the invention. The bolts 80 would be threaded into corresponding nuts 82, cinch nuts 140 etc., by a screwdriver or other means by virtue of the slot or recess 90 at the end of the bolts 80. The air bag 100 with its overlapping flaps 102 are placed about the retainer and the associated openings 106 fitted over each of the bolts 80 in overlapping configuration. The securement material 110 is then placed about the retainer 20, air bag 100 and bolts 80, forming a configuration similar to that shown in FIG. 9 and 12. Such assembly may be placed within a partial shroud such as 124 or within an outer can 130 such as that shown in FIG. 8. As can be appreciated, the shroud 124 or can 130 can be formed as an integral portion of the vehicle's instrument panel or as a separate element. If a partial shroud is used the retainer 20 with air bag, etc. is positioned therein with bolts 80 received in aligned openings 126. The gas generator is thereafter received within the open end 122 of the retainer 20. If a can such as 130 is used upon placement of the retainer 20, air bag 100, etc., within the can, the bolts 80 will extend through cooperating openings 134 in a rear wall thereof. The gas generator may then be slid through an opening 136 in a side wall 138 and into the retainer 20. Thereafter, the bolts would be moved to engage the gas generator in its secured configuration and a nut 140 positioned about each bolt 80 to secure the gas generator 50, retainer, etc. within the can 130 or shroud 124. The can 130 or shroud 120 may be attached to structurally sound members, shown diagrammatically as 138, of the vehicle proximate the instrument panel for proper mounting of the above-described device. A portion of the instrument panel or separate cover (not shown) is placed over the air bag.

As can be seen from the above, the retainers 20 or 20' secure the gas generator 50 and provide heat shielding functions to protect and inflate the air bag. By attaching the retainer to the vehicle structure via the bolts 80 or other means, permits the shroud 124 or can 130 to be fabricated of an extremely light weight material such as plastic since the reaction forces generated upon ignition of the gas generator are transferred directly to the vehicle support members 138. The shroud 124 and/or can 130 can, of course, be themselves structural members designed to absorb a portion of the reaction force, however, in this case such elements, i.e., the shroud and can, would be fabricated of metal or the like.

Figure 14:
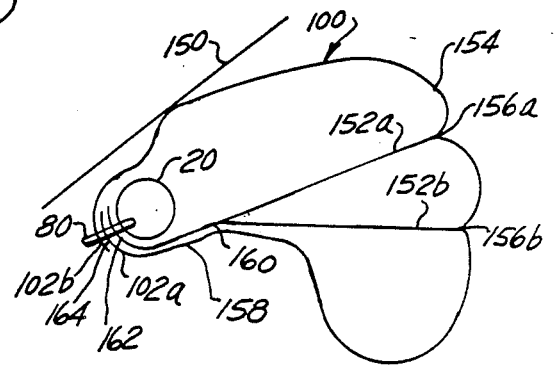
FIG. 14 illustrates a further embodiment of the invention.

Reference is made to FIG. 14 which illustrates the air bag 100 in its inflated position. The retainer is shown schematically at 20 and is placed in a known manner within an upper top portion of the vehicle's dashboard (not shown) such that upon inflation the air bag expands and impacts a windshield 150. Thereafter, the air bag is deflected forwardly and downwardly toward the occupant. To assist in the definition of the trajectory that the air bag takes upon inflation, and to somewhat define its inflated shape, many air bags include tethers such as 152a and b. These tethers as is known in the art comprise reinforced material portions that are typically sewn to selected portions within the interior of the air bag 100. As an example of one type of tether used in the art, is a reinforced narrow band of material similar to seat belt webbing. This tether is typically sewn across the face 154 of the air bag at locations 156a and/or b. The tether extends toward the narrowed neck portion 158 of the air bag and had typically been sewn together at location 160. Another type of tether is that formed by a trapezoidal piece of material having its wider end sewn to the air bag 100 at location 156 and its narrower end, i.e., approximate the neck 158 of the air bag sewn at location 160. The process of sewing the tether at the forward location 156 of the air bag is a relatively straightforward operation. However, the process of sewing the tether at location 160 is considerably more difficult. If two tethers 152a and b are used, the sewing operation typically requires that both tethers be sewn together and to the air bag at location 160. This problem can be obviated by the present invention. It is envisioned that the tethers 152 would be sewn to the air bag at location(s) 156 in the normal manner. The tethers would as known in the art be loosely received relative to the sides of the air bag and extend toward the narrowed neck 158 of the air bag. The tethers, however, in the present invention would include an additional length of material generally shown as 162 which would be brought into engagement with the rear side of the retainer 22. This additional material 162 would also include openings 164 to permit the receipt of the bolts 80. In this manner the tethers can now be fixed to a permanent and definite reference point to more precisely define the trajectory of the air bag and any tether reaction loading supported by the retainer 22 as opposed to being absorbed by other portions of the air bag.

Many changes and modifications in the above described embodiment of the invention can, of course, be carried out without departing from the scope thereof. Accordingly, that scope is intended to be limited only by the scope of the appended claims.

We claim:

1. A device comprising a planar metal sheet having formed thereon at least a first set of opposing shaped slots such that upon forming the planar sheet as an open ended generally cylindrical member or cylinder first portions of the sheet, defined by the slots, extend away from the surface of the formed cylindrical member and form in conjunction with other surfaces of the sheet a plurality of first apertures, and the extending first portions serving to define heat sheet means for shielding a portion of an air bag, adapted to be secured thereabout, from hot gas generated by a gas generator, the formed cylindrical member adapted to receive a gas generator therein, the device including securement means, interacting with a rearward portion of the cylindrical member and adapted for urging a gas generator into forward facing portions of the cylindrical member, for securing same in place.

2. The device as defined in claim 1 where the sides of the sheet, upon forming the cylinder are in overlapping engagement forming the rearward portion of the cylinder, substantially opposite the apertures.

3. The device as defined in claim 1 wherein the end portions of the sheet, outboard of the slots, upon formation of the cylinder, define respective end bands.

4. The device as defined in claim 1 wherein a center portion of the sheet, generally parallel to the sheet sides, upon forming the cylinder, defines an axially extending front side circumferentially separating opposing apertures.

5. The device as defined in claim 1 wherein the securement means comprises a first member radially advanceable through the rearward portion of the cylinder and adapted to engage a portion of the gas generator urging same away from the rearward portion and against forward facing portions.

6. The device as defined in claim 5 wherein an outer wall of the gas generator is deformable and wherein each first member compressively loads the wall to form a respective depression, and wherein each depression and first member cooperate to radially and axially secure the gas generator to the cylinder.

7. The device as defined in claim 5 wherein the first member includes a bolt having external threads thereof and where the securement means further includes first means, at the rearward portion, for receiving the bolt.

8. The device as defined in claim 7 wherein each side of the planar sheet includes a set of first openings which with the sheet sides in overlapping configuration, are registered and coaxially aligned one to the other, and through which a corresponding first member may be received, and a corresponding first means attached thereto.

9. The device as defined in claim 8 wherein the respective ones of the first set of openings are in line with corresponding forward facing portions of the cylinder.

10. The device as defined in claim 8 wherein each first means includes a threaded member attached to a corresponding one the openings through which a corresponding first member is thereby received.

11. The device as defined in claim 10 wherein each first means includes a clinch nut or rivet, having internal threads, received through corresponding sets of aligned first openings, for securing the sides of the formed cylinder together and for receiving a corresponding first member.

12. The device as defined in claim 1 including a second set of opposing shaped slots, axially spaced from the first set of slots, such that upon forming the cylinder, second portions of the sheet defined by the second set of slots, tend to extend away from the surface of the cylinder, substantially parallel to the extending first portions to form a plurality of second apertures.

13. The device as defined in claim 1 further including an air bag, in folded configuration, enveloping the cylinder and extending first portions and through which extends each first member, the extending first portions maintains portions of the air bag spaced from the at least first apertures.

14. The device as defined in claim 12 further including an air bag, in folded configuration, enveloping the cylinder and extending first and second portions and through which extends each first member, the extending first and second portions maintaining portions of the air bag spaced from the first and second apertures.

15. The device as defined in claim 13 wherein the cylinder and air bag are received within an outer member having another plurality of openings in registration with the first openings, and wherein each first member extending through a corresponding one of the another openings, and means for attaching same to the outer member 16. The device as defined in claim 15 wherein a gas generator is inserted within the cylinder, the first member moved into contacting engagement therewith securing same within the cylinder and the attaching means moved to lock each first member to the outer member.

17. The device as defined in claim 5 wherein the first member includes a bolt having external threads 18. The device as defined in claim 17 wherein an outer wall of the gas generator is deformable and wherein each first member compressively loads the wall to form a respective depression, and wherein each depression and first member cooperate to radially and axially secure the gas generator to the cylinder.

19. The device as defined in claim 13 wherein the air bag includes therein at least one tether, having a first end secured to an occupant facing surface and having a second end, the second end fixedly secured to the cylinder.

20. The device as defined in claim 19 wherein the second end includes an end aperture positioned about a corresponding first member

* * * * *